June 11, 1957     I. RABINOWITZ     2,795,092
PRESSURE PACK AND SEALING MACHINE FOR EDIBLES
Filed March 11, 1954
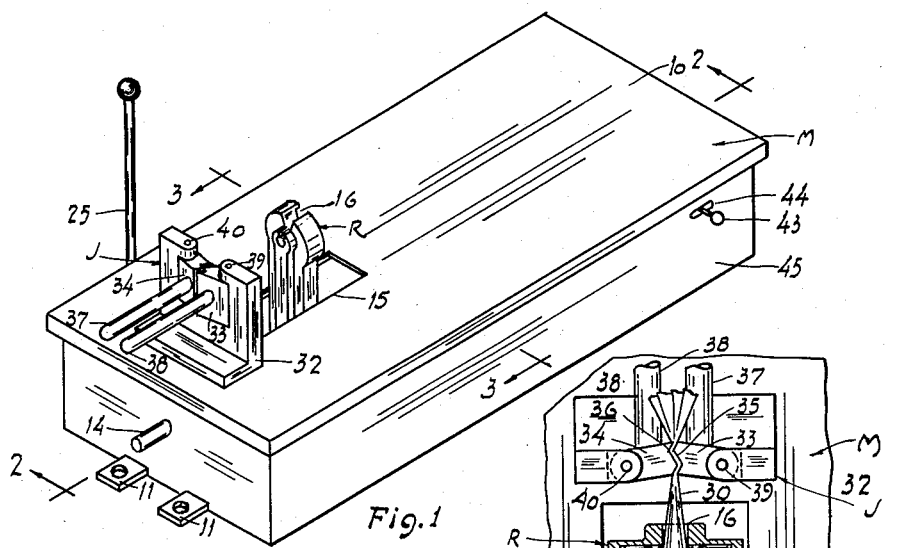
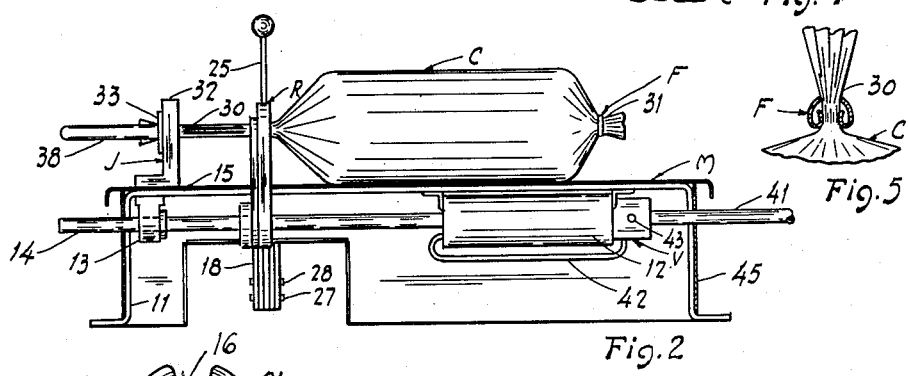
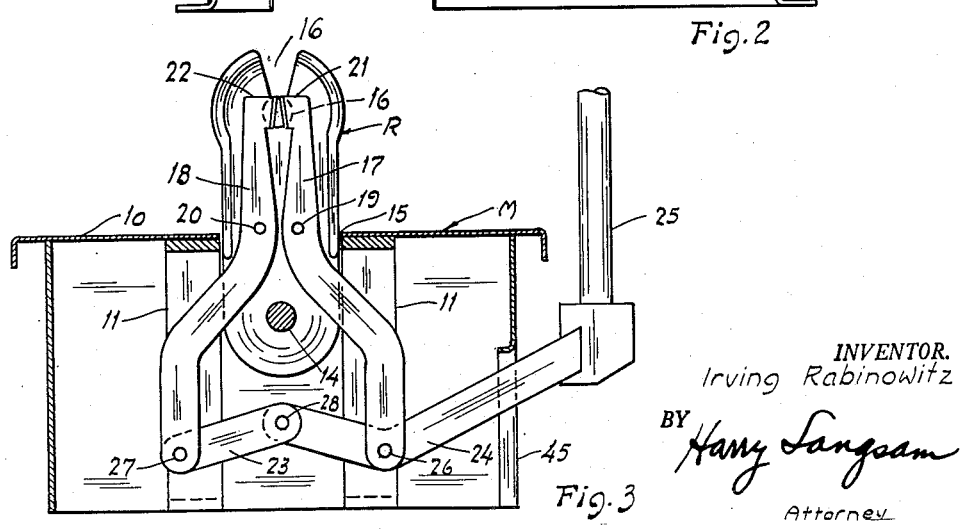
*INVENTOR.*
Irving Rabinowitz
BY Harry Langsam
*Attorney*

United States Patent Office 2,795,092
Patented June 11, 1957

2,795,092

PRESSURE PACK AND SEALING MACHINE FOR EDIBLES

Irving Rabinowitz, Philadelphia, Pa.

Application March 11, 1954, Serial No. 415,612

2 Claims. (Cl. 53—113)

My invention relates to packaging devices and more particularly to machines for packing meat products into prefabricated containers.

In my prior filed patent application, Serial No. 276,847, filed March 15, 1952, now Patent No. 2,685,394, issued August 3, 1954, I disclose a pressure pack machine. In the processing of certain meat products for vending, it is desirable to place the meat into a sanitary container, of minimum size. In this way the meat product is protected from contamination and more units of packaged meat can be contained within a given space. Better preservation of the meat product is also possible if a minimum of air is entrapped with the meat in the container. The packaging of the meat product in prefabricated containers also makes it possible for the vender to display, on the exterior of the container, items in printed and picture form that are of interest to the consumer.

It is, therefore, an object of my invention to devise a machine that effects the containment of a given quantity of meat product in a minimum size container by pressure.

Another object of my invention is to devise a meat packaging machine that requires the minimum of effort on the part of the operator to compress the edible contents in a container by fluid pressure and to seal the container by applying hand pressure.

Another object of my invention is to devise a meat packaging machine that permits the packing of the meat product in prefabricated containers.

Another object of my invention is to devise a meat packaging machine that requires the minimum of handling of the meat product by the operator of the machine.

Another object of my invention is to devise a machine that packs a meat product into a flexible container by securely holding one end of the container while the meat product is forced under fluid pressure toward the opposite end of the container, and then sealing said container by a hand actuated lever to retain the meat product within the confines of the container.

Another object of my invention is to provide a method and device for packaging meat products in containers of uniform size and under attractive packaging conditions.

Another object of my invention is to provide a machine that forces a ferrule that has been placed over the open gathered end of a flexible casing along the casing, under pressure, to provide firm containment of a meat product, and then crimping the ferrule by hand operated lever to retain the casing over the meat products.

Other objects of my invention are to provide an improved device of the character described that is easily and economically produced, which is sturdy in construction, and which is highly effective in operation.

With the above and related objects in view, my invention consists in the details of construction and combination of parts as will be more fully understood from the description, when the description is read in conjunction with the accompanying drawing, in which:

Fig. 1 is an isometric view of a machine for packaging meat products, which embodies the features of my invention.

Fig. 2 is a sectional view of the machine shown in Fig. 1, taken along line 2—2.

Fig. 3 is a sectional view of the machine shown in Fig. 1, taken along line 3—3.

Fig. 4 is a fragmental plan view of the machine shown in Fig. 1, showing the ram head in cross section, and Fig. 5 is a fragmental view of the closed end of the casing showing the sealing ferrule in place on the casing end.

Referring now in greater detail to the drawing wherein similar referenced characters refer to the same parts throughout, I disclose a pressure packaging machine, generally designated M, comprised of a table 10, supported by a metal frame 11, also supported by said metal frame 11 is a fluid pressure actuated cylinder 12 containing a piston (not shown). The piston within the cylinder is fixedly attached to a connecting rod 14, also fixedly attached to said connecting rod 14 is a ram, generally designated R. Supporting the outer end of the connecting rod 14 and providing a bearing for lateral movement of the rod 14 is a bearing 13; the bearing is secured to and is supported by the machine frame 11.

The ram R, which extends upward through a rectangular opening or slot 15 in the table top 10, has a hole 16 through its upper portion arranged to receive the gathered end 30 of a prefabricated flexible casing, generally designated C, see Fig. 2 and Fig. 4. The ram R is adapted to move longitudinally in the slot 15 to compress the contents of the container, under pressure, into a small space. The ram R is attached to the rod 14 and the lever arms 17 and 18 are pivotally attached to the ram R at 19 and 20, respectively. The lever arms have limited rotatable movement around the bearing pins 19 and 20. The upper end of lever arms 17 and 18 have affixed thereto jaws 21 and 22, arranged to engage the ferrule, generally designated F, to move it longitudinally with movement of the ram R and to compress said ferrule on the gathered end 30 of the casing C, in a manner as hereinafter described. The lower ends of the lever arms 17 and 18 are connected by linkage 23 and 24 to a hand actuated operating lever 25 which compresses the ferrule F about the container.

When the operating lever 25 is in an upright position, as illustrated in Fig. 3, the jaws 21 and 22 are in close proximity to each other; and they are in that position when compressing a ferrule on the casing end. When the lever arm 25 is moved outward from the table of the machine to open the jaws 21 and 22, the linkage 23, 24 pivotally attached to the bottom of the lever arms at 17 and 18 respectively, and pivotally connected together at 28, causes the lower ends of the lever arms 17 and 18 to move together, thereby moving the jaws 21 and 22 at the upper ends of the lever arms apart. It will be observed that the ram and the attached lever arms, jaws, linkage, and operating lever all move in unison with the lateral movement of the connecting rod 14 for, as described above, the ram R is fixedly attached to the connecting rod.

Fixedly attached to the table 10 and supporting frame 11 is a clamping device, generally designated J; which has an upright member 32, to which is pivotally attached, at 39 and 40, jaws 33 and 34. The jaws 33 and 34 are arranged to hold the gathered open end 30 of the casing C during the packaging of the meat product. The jaws 33 and 34 are serrated on their adjacent ends 35 and 36, respectively, so they will securely grip the gathered end of the casing during the packing operation. Handles 37 and 38 are securely fixed to the jaws 33 and 34 respectively, to enable the operator to manipulate the jaws in securing and releasing the gathered casing end C.

A fluid pressure valve, generally designated V, that receives fluid pressure from the pipe 41, is arranged to admit and release, to the opposite ends of the fluid pressure cylinder 12, fluid pressure to move the piston (not shown) within the cylinder as required by the operator. The pipe 42 connects the valve V to one end of the cylinder 12 while connection to the adjacent end of the cylinder is made directly between the valve and the cylinder. A valve operating lever 43 extends out through the hole 44 in the machine base enclosure 45.

Two types of prefabricated tubular containers can be used with the machine, one type being closed at one end similar to a bag, the other type is tubular in form and one of the open ends 31 is gathered together and a ferrule F attached by the clamping jaws 33 and 34 of the machine, prior to the placing of the meat product within the container; the latter type container is illustrated in Fig. 2.

Now the method of packaging the meat product is as follows: The operator places a given quantity of meat product into the container C, gathers the end 30 of the container together, and places over the gathered end 30 a ferrule F. Then, passing the gathered end 30 through the hole 16 in the ram R, he clamps the gathered end 30 between the jaws 33 and 34. The operator then operates the valve V by way of the operating lever 43 to admit fluid pressure into the fluid pressure cylinder 12 at the end adjacent to the operating end of the machine. This forces the piston (not shown) within the cylinder toward the back of the machine, as the connecting rod and attached ram are fixedly connected to the piston they move with the piston to squeeze the meat product within the container C toward the closed end of the container. During this squeezing operation, the ferrule F on the gathered end 30 of the container C assumes the position shown in Fig. 4 and in this position is ready to be crimped onto the gathered end of the container. When the meat product has been compressed within the container C the desired amount, the operator moves the lever arm 25 inward toward the machine, the linkage attached to the lever arm 25 functions to move the jaws 21 and 22 together, crimping the ferrule F about the gathered end 30 of the casing C, as illustrated in Fig. 5. The operator now manipulates the valve V to release the air in the forward end of the fluid pressure cylinder 12 and apply air to the rear end of the fluid pressure cylinder. The fluid pressure on the rear of the piston within the cylinder forces the piston, connecting rod, and ram toward the clamping device J, releasing the gathered end 30 of the casing C from the jaws of the clamping device. The excess casing is snipped off and the meat product is neatly, rapidly, and economically packaged.

The excess portion of the prefabricated container is perforated to permit the air within the package to escape during the packaging operation. In certain applications, such as when the vendor desires to smoke the meat product after it has been packaged, the container is perforated with holes throughout its entire length.

Although my invention has been described in considerable detail, such description is intended as being illustrative rather than limiting, since the invention may be variously embodied, and the scope of the invention is to be determined as claimed.

I claim as my invention:

1. A meat product pressure packing machine comprised of a pair of jaws adapted to securely hold the gathered end of a prefabricated container for the meat product, a pressure actuated ram positioning a ferrule around said gathered end of said container, crimping means attached to said ram, said ram forcing said ferrule onto said gathered end of said container to compress the meat product compactly within said container, said crimping means comprised of a pair of lever arms, a jaw mounted on one end of one of said arms, said arms pivotally mounted intermediate its ends, a link pivotally connected to one end of said arm, a second link pivotally connected to said other arm and the ends of each of said links pivotally connected together, said second link having an extension thereon which is attached to an operating lever, and said lever being adapted to actuate said linkages whereby said jaws may be opened or compressed about a ferrule, and a rod to which said crimping means is movable.

2. A meat product pressure packing machine comprised of a pair of jaws adapted to securely hold the gathered end of a prefabricated container for the meat product, a fluid pressure actuated ram positioning a ferrule around said gathered end of said container, crimping means attached to said ram, said ram forcing said ferrule onto said gathered end of said container and said jaws crimping said ferrule on said gathered end of the container into the fully compressed condition, said crimping means comprised of a pair of lever arms, a jaw mounted on one end of one of said arms, said arms pivotally mounted intermediate its ends, a link pivotally connected to one end of one arm, a second link pivotally connected to said other arm and the ends of each of said links pivotally connected together, said second link having an extension thereon which is attached to an operating lever, and said lever being adapted to actuate said linkages whereby said jaws may be opened or compressed about a ferrule.

References Cited in the file of this patent

UNITED STATES PATENTS

| | | |
|---|---|---|
| 2,424,849 | Rogoff et al. | July 29, 1947 |
| 2,472,778 | Quinn et al. | June 7, 1949 |
| 2,608,333 | Marziani | Aug. 26, 1952 |
| 2,677,487 | Friedman | May 4, 1954 |
| 2,685,394 | Rabinowitz | Aug. 3, 1954 |